(No Model.)
F. HELLER.
WATCH MAKER'S RUBY PIN SETTER.
No. 464,870. Patented Dec. 8, 1891.
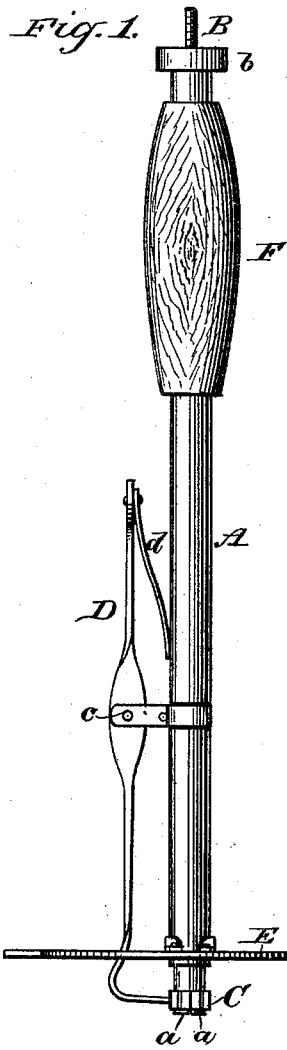
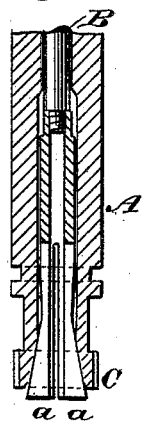
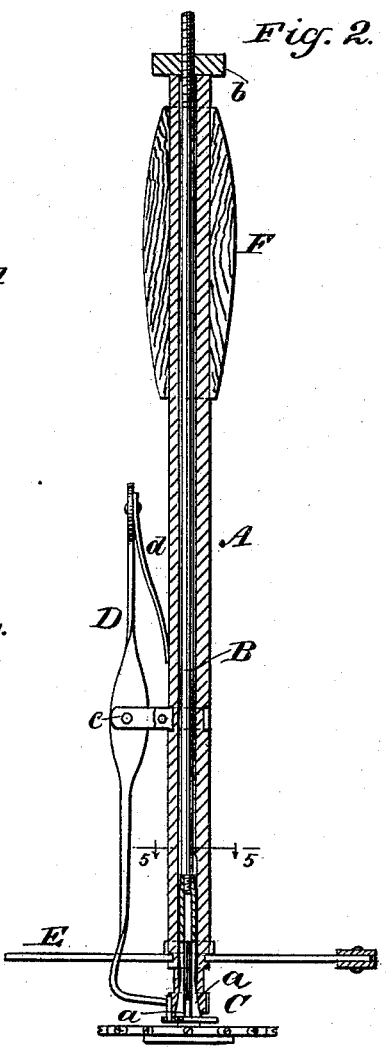
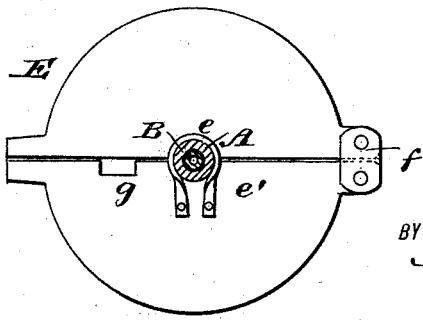
WITNESSES:
J. C. Criswell
C. Sedgwick
INVENTOR
F. Heller
BY Munn & Co.
ATTORNEYS
THE NORRIS PETERS CO., PHOTO-LITHO., WASHINGTON, D. C.

UNITED STATES PATENT OFFICE.

FRANK HELLER, OF BRAZIL, INDIANA.

WATCH-MAKER'S RUBY-PIN SETTER.

SPECIFICATION forming part of Letters Patent No. 464,870, dated December 8, 1891.

Application filed August 4, 1891. Serial No. 401,648. (No model.)

*To all whom it may concern:*

Be it known that I, FRANK HELLER, of Brazil, in the county of Clay and State of Indiana, have invented a new and Improved Jeweler's Tool, of which the following is a specification, reference being had to the annexed drawings, forming a part thereof, in which—

Figure 1 is a side elevation of my improved jeweler's tool. Fig. 2 is a longitudinal section. Fig. 3 is an enlarged longitudinal section of the chuck. Fig. 4 is an enlarged end view, and Fig. 5 is a horizontal plan view taken on line 5 5 in Fig. 2.

Similar letters of reference indicate correseponding parts in all the views.

The object of my invention is to provide a tool for holding the balance of a watch while setting the ruby-pin.

My invention consists in a handle provided with a chuck for holding the balance-staff and furnished with a head having a series of grooves for receiving the roller-pin and a clamping device for holding the roller-pin in position in the roller-table while the cement is applied.

The tube A, forming the body of the tool, is reduced in diameter at its lower end and bored conically to receive the chuck-jaws $a$, which are attached to a rod B, extending through the tube A, and threaded on its projecting end to receive a milled nut $b$, by which the chuck is operated. On the conically-bored end of the tube A is placed a collar C, having series of grooves parallel with the axis of the tube A, the said grooves being of different sizes and arranged at different distances from the center of the tube to receive the roller-jewels of different makes of watches.

To the tube A are attached the ears $c$, between which is pivoted the clamping-lever D, the lower end of said lever being curved inwardly toward the collar C, as shown, the upper end being provided with a spring $d$, which rests upon the tube and tends to force the lower end of the lever against the collar C.

Upon the tube A is secured a disk E, which is divided on a diametrical line into two parts $e\ e'$, which are connected together by a hinge $f$. In the part $e'$ of the disk E is formed a notch $g$, through which the clamping-lever D projects. Upon the tube A, near the end to which the nut $b$ is applied, is secured a handle F, of wood or other suitable material.

The balance-staff is inserted between the jaws $a$, and the jaws are closed tightly upon the staff by turning the milled nut $b$. Before the staff is tightly clamped it is turned so as to bring the hole in the roller-table opposite a suitable groove in the collar C. The roller-jewel is placed in the groove in the collar and inserted in the hole in the table, the clamping-lever D being allowed to press upon the jewel and thus hold it in its place in the groove in the collar C. The cement by which the jewel is held is applied to the roller-table and jewel and melted by the application of a blow-pipe flame below the disk E.

By means of my improved tool a roller-jewel of any watch may be quickly and accurately secured in place.

Having thus described my invention, I claim as new and desire to secure by Letters Patent—

1. In a jewel-setting tool, the combination of a staff-holding chuck, a collar surrounding the chuck and provided with longitudinal grooves of different depths, and a clamp for holding the roller-jewel in one of the grooves, substantially as described.

2. The combination of the tubular handle A, bored conically at the end, the chuck-jaws $a$, the rod B, the nut $b$, the longitudinally-grooved collar C, having grooves of different depths and sizes, and the spring-pressed clamping-lever D, substantially as described.

3. The combination of the tubular handle A, bored conically at the end, the chuck-jaws $a$, the rod B, the nut $b$, the longitudinally-grooved collar C, having grooves of different depths and sizes, the spring-pressed clamping-lever D, and the divided disk E, substantially as described.

FRANK HELLER.

Witnesses:
 GEO. S. RAPER,
 CHARLES H. ADAMS.